United States Patent [19]

Nakano et al.

[11] Patent Number: 6,013,726

[45] Date of Patent: *Jan. 11, 2000

[54] COMPOSITION OF STYRENE RESIN, THERMOPLASTIC RESIN AND RUBBER

[75] Inventors: Akikazu Nakano; Takashi Sumitomo; Keisuke Funaki, all of Ichihara; Toshikazu Ijitsu; Michihiro Sawada, both of Sodegaura-machi; Masahiko Kuramoto; Masakazu Suzuki, both of Ichihara, all of Japan

[73] Assignee: Idemitsu Kosan Co., Ltd., Tokyo, Japan

[*] Notice: This patent is subject to a terminal disclaimer.

[21] Appl. No.: 08/463,899

[22] Filed: Jun. 5, 1995

Related U.S. Application Data

[62] Division of application No. 08/411,407, Mar. 28, 1995, abandoned, which is a continuation of application No. 08/167,190, Dec. 16, 1993, abandoned, which is a division of application No. 07/510,110, Apr. 17, 1990, Pat. No. 5,395,890, and a continuation-in-part of application No. 07/930,329, Aug. 17, 1992, Pat. No. 5,292,587, said application No. 07/510,110, and a continuation-in-part of application No. 07/524,372, May 15, 1990, Pat. No. 5,166,238, which is a continuation-in-part of application No. 07/267,990, Nov. 7, 1988, abandoned, and a continuation-in-part of application No. 07/285,707, Dec. 16, 1988, abandoned, and a continuation-in-part of application No. 07/492,205, Mar. 12, 1990, abandoned, which is a continuation of application No. 07/233,899, Aug. 15, 1988, abandoned, which is a continuation-in-part of application No. 07/096,946, Sep. 14, 1987, abandoned, said application No. 07/524,372, is a continuation-in-part of application No. 07/358,353, May 11, 1989, abandoned, and a continuation-in-part of application No. 07/423,602, Oct. 16, 1989, abandoned, which is a continuation of application No. 07/268,159, Nov. 7, 1988, abandoned, and a continuation-in-part of application No. 07/492,206, Mar. 12, 1990, abandoned, which is a continuation of application No. 07/347,182, May 3, 1989, abandoned, which is a continuation of application No. 07/185,515, Apr. 25, 1988, abandoned, said application No. 07/930,329, Aug. 17, 1992, is a division of application No. 07/464,935, Jan. 16, 1990, Pat. No. 5,164,479.

[30] Foreign Application Priority Data

Apr. 12, 1987 [JP] Japan ................................. 62-305838
Jan. 13, 1988 [JP] Japan ................................. 63-003844
Jan. 14, 1988 [JP] Japan ................................. 63-004923
May 20, 1988 [JP] Japan ................................. 63-121700

[51] Int. Cl.[7] .............................. C08K 7/14; C08L 51/04; C08L 53/02; C08L 67/02

[52] U.S. Cl. ........................... 525/66; 524/504; 524/505; 524/506; 524/507; 524/508; 524/513; 524/514; 524/520; 524/522; 524/525; 524/527; 524/528; 525/64; 525/67; 525/68; 525/72; 525/78; 525/80; 525/83; 525/84; 525/85; 525/92 B; 525/92 D; 525/92 E; 525/92 F; 525/92 J; 525/94; 525/98

[58] Field of Search .......................... 524/504, 505, 524/506, 507, 508, 513, 514, 520, 522, 525, 527, 528; 525/64, 66, 67, 68, 72, 78, 80, 83, 84, 85, 92 B, 92 D, 92 E, 92 F, 92 J, 94, 98, 101, 125, 133, 166, 179, 187, 189, 199, 221, 227, 228, 239, 240, 241

[56] References Cited

U.S. PATENT DOCUMENTS

| | | | |
|---|---|---|---|
| 4,031,166 | 6/1977 | Bornstert et al. ................... | 260/876 |
| 4,242,254 | 12/1980 | Abolins ................................. | 260/40 |
| 4,528,221 | 7/1985 | Komatsuzaki et al. ............. | 428/35 |
| 4,680,353 | 7/1987 | Ishihara et al. ..................... | 526/160 |
| 4,826,955 | 5/1989 | Akkapeddi et al. ................ | 528/347 |
| 5,089,353 | 2/1992 | Negi et al. ........................... | 428/518 |
| 5,109,068 | 4/1992 | Yamasaki et al. .................. | 525/151 |
| 5,127,158 | 7/1992 | Nakano ............................... | 29/849 |
| 5,145,950 | 9/1992 | Funaki et al. . | |
| 5,156,797 | 10/1992 | Yamasaki et al. . | |
| 5,164,479 | 11/1992 | Funaki et al. . | |
| 5,166,238 | 11/1992 | Nakano et al. ..................... | 524/120 |
| 5,183,871 | 2/1993 | Yamasaki et al. . | |
| 5,188,930 | 2/1993 | Funaki et al. . | |
| 5,200,454 | 4/1993 | Nakano ............................... | 524/409 |
| 5,202,402 | 4/1993 | Funaki et al. . | |
| 5,219,940 | 6/1993 | Nakano ............................... | 525/133 |
| 5,270,353 | 12/1993 | Nakano et al. ..................... | 523/214 |
| 5,273,830 | 12/1993 | Yaguchi et al. . | |
| 5,283,117 | 2/1994 | Arai et al. . | |
| 5,286,762 | 2/1994 | Funaki et al. . | |
| 5,292,587 | 3/1994 | Funaki et al. . | |
| 5,318,839 | 6/1994 | Arai et al. . | |
| 5,326,813 | 7/1994 | Okada et al. ....................... | 524/508 |
| 5,346,950 | 9/1994 | Negi et al. . | |
| 5,352,727 | 10/1994 | Okada ................................. | 524/495 |
| 5,357,014 | 10/1994 | Uchida et al. . | |
| 5,374,462 | 12/1994 | Funaki et al. . | |
| 5,391,611 | 2/1995 | Funayama et al. ................. | 524/508 |
| 5,395,890 | 3/1995 | Nakano et al. . | |
| 5,418,275 | 5/1995 | Okada et al. ....................... | 524/504 |
| 5,436,397 | 7/1995 | Okada ................................. | 524/494 |
| 5,444,126 | 8/1995 | Okada et al. ....................... | 525/391 |
| 5,543,462 | 8/1996 | Okada et al. ....................... | 525/74 |

FOREIGN PATENT DOCUMENTS

| | | |
|---|---|---|
| 62-257948 | 11/1987 | Japan . |
| 62-257950 | 11/1987 | Japan . |
| 1187700 | 4/1970 | United Kingdom . |

*Primary Examiner*—Robert E. Sellers
*Attorney, Agent, or Firm*—Oblon, Spivak, McClelland, Maier & Neustadt, P.C.

[57] ABSTRACT

A polystyrene-based resin composition containing a styrene-based resin with mainly syndiotactic configuration, a polyamide, and a rubber polymer as main components. Styrene-based resins of mainly syndiotactic configuration include polystyrene, poly(alkylstyrene), poly(halogenated styrene), poly(alkoxystyrene), styrene copolymers comprised of polymerized units of at least of styrene, alkylstyrene, halogenated styrene and alkoxystyrene, and mixtures thereof

15 Claims, No Drawings

COMPOSITION OF STYRENE RESIN, THERMOPLASTIC RESIN AND RUBBER

This is a division of application Ser. No. 08/411,407, filed Mar. 28, 1995, abandoned, which is a continuation of application Ser. No. 08/167,190, filed Dec. 16, 1993, abandoned, which is a division of application Ser. No.07/510,110, now U.S. Pat. No. 5,395,890, filed Apr. 17, 1990; and a continuation-in-part of application Ser. No. 07/930, 329, filed Aug. 17, 1992, now U.S. Pat. No. 5,292,587;

and a continuation-in-part of application Ser. No. 07/524, 372, filed May 15, 1990, now U.S. Pat. No. 5,166,238.

Said application Ser. No. 07/510,110 is a continuation-in-part of application Ser. No. 07/267,990, filed Nov. 7, 1988, now abandoned; and a continuation-in-part of application Ser. No. 07/285,707, filed Dec. 16, 1988, now abandoned; and a continuation-in-part of Ser. No. 07/492,205, filed Mar. 12, 1990, now abandoned, which is a continuation of application Ser. No. 07/233,899, filed Aug. 15, 1988, now abandoned, which is a continuation-in-part of application Ser. No. 07/096,946, filed Sep. 14, 1987, now abandoned.

Said application Ser. No. 07/524,372 is a continuation-in-part of application Ser. No. 07/358,353, filed May 11, 1989, now abandoned; and a continuation-in-part of application Ser. No. 07/423,602, filed Oct. 16, 1989, now abandoned, which is a continuation of application Ser. No. 07/268,159, filed Nov. 7, 1988, now abandoned; and a continuation-in-part of application Ser. No. 07/492,206, filed Mar. 12, 1990, now abandoned, which is a continuation of application Ser. No. 07/347,182, filed May 3, 1989, now abandoned, which is a continuation of application Ser. No. 07/185,515, filed Apr. 25, 1988, now abandoned.

Said Application No. 07/930,329 is a division of application Ser. No. 07/464,935, filed Jan. 16, 1990, now U.S. Pat. No. 5,164,479.

BACKGROUND OF THE INVENTION

1. Field of the Invention

The present invention relates to a styrene-based resin composition and more particularly to a styrene-based resin composition containing (A) a styrene-based resin having mainly syndiotactic configuration; and (B) a thermoplastic resin other than the styrene-based resin, and/or (C) a rubber-like polymer, and/or (D) an inorganic filler. The composition of the invention is excellent in heat resistance and impact resistance.

2. Description of the Related Art

In general, thermoplastic resins are excellent in moldability and have sufficiently high stiffness as compared with other materials and thus are used in production of various products, e.g., household articles, electric appliances and machine parts.

However, thermoplastic resins have a disadvantage in that heat resistance is not sufficiently high for many purposes, although they have excellent properties as described above.

The present inventors' group has succeeded in developing styrene-based polymers having a high syndiotacticity and further developed thermoplastic resin compositions containing the above styrene-based polymers (Japanese Patent Application Laid-Open Nos. 104818/1987 and 257950/1987).

In a composition of resins which are inherently not compatible with each other, the strength in the interface of phases is inevitably poor, and thus the effect of improvement by compounding is expected to be limited.

SUMMARY OF THE INVENTION

An object of the present invention is to provide styrene-based resin compositions having excellent impact resistance.

Another object of the present invention is to provide styrene-based resin compositions having both excellent impact resistance and heat resistance.

A further object of the present invention is to provide a styrene-based resin composition which is excellent in compatibility among components.

Still another object of the present invention is to provide a styrene-based resin composition which has excellent physical properties such as tensile strength and modulus of elasticity as well as impact resistance and heat resistance.

Still another object of the present invention is to provide a styrene-based resin composition having excellent physical properties, which is suitable as a material for injection molding, extrusion molding and so forth.

The present invention relates to a styrene-based resin composition containing (A) a styrene-based resin having mainly syndiotactic configuration combined with (B) a thermoplastic resin other than Component (A), and/or (C) a rubber-like polymer as the main components.

The present invention also relates to a styrene-based resin composition containing the above Components (A) and (B) and/or (C) which further contains (D) an inorganic filler as the main components.

Thus, the present invention proposes, inter alia, to compound a syndiotactic polystyrene with a thermoplastic resin such as polycarbonate resins so that the resultant polystyrene-based resin composition is imparted with greatly improved heat resistance, mechanical strengths and other properties in good balance as a useful molding resin composition. The invention also proposes to compound a syndiotactic polystyrene with a rubber-like polymer or with an inorganic filler such as glass fibers, optionally, in combination with a thermoplastic resin so that the resultant resin composition is imparted with further improved properties.

DESCRIPTION OF PREFERRED EMBODIMENTS

The resin composition of the present invention contains Components (A) and (B) and/or (C) as main components. An inorganic filler (D) may also be used as required.

Component (A) is a styrene-based resin with mainly syndiotactic configuration. The styrene-based resin with mainly syndiotactic configuration refers to a polymer with mainly stereo structure such that phenyl groups or substituted phenyl groups as side chains are located alternately at opposite positions relative to the main chain composed of carbon-carbon bonds. The tacticity is quantitatively determined by a nuclear magnetic resonance method using a carbon isotope ($^{13}$C-NMR method). The tacticity as determined by the $^{13}$C-NMR method is indicated in terms of proportions of structural units continuously connected to each other, i.e., a diad in which two structural units are connected to each other, a triad in which three structural units are connected to each other, and a pentad in which five structural units are connected to each other. The styrene-based resin with mainly syndiotactic configuration has syndiotactic configuration such that the proportion in a diad is at least 75% and preferably at least 85%, or the proportion in a pentad (racemic pentad) is at least 30% and preferably at least 50%. The styrene-based resin includes polystyrene, poly (alkylstyrene), poly(halogenated styrene), poly (alkoxystyrene), poly(vinyl benzoate), and their mixtures, and copolymers containing the above polymers as main components.

The poly(alkylstyrene) includes polymethylstyrene, polyethylstyrene, polyisopropylstyrene, and poly(tert-butylstyrene). The poly(halogenated styrene) includes polychlorostyrene, polybromostyrene, and polyfluorostyrene. The poly(alkoxystyrene) includes polymethoxystyrene and polyethoxystyrene. Of these polymers, polystyrene, poly(p-methylstyrene), poly(m-methylstyrene), poly(p-tert-butylstyrene), poly(p-chlorostyrene), poly(m-chlorostyrene), poly(p-fluorostyrene), and a copolymer of styrene and p-methylstyrene are most preferable.

The styrene-based resin to be used in the present invention in general is not critical in molecular weight. The weight average molecular weight is preferably at least 10,000, more preferably 50,000 to 5,000,000 and most preferably 100,000 to 3,000,000. The molecular weight distribution is not critical and may be narrow or wide. However, if highest heat resistance and mechanical strength is required the molecular weight should be at least the preferable 100,000 and most preferably at least 200,000. The styrene-based resin to be used in the present invention can be produced, for example, by polymerizing a styrene-based monomer (corresponding to the above styrene-based resin) with the use of a catalyst containing a titanium compound, and a condensate of water and trialkylaluminum in the presence of an inert hydrocarbon solvent or in the absence of a solvent (Japanese Patent Application Laid-Open No. 187708/1987).

Component (B) is a thermoplastic resin other than Component (A). Various kinds of thermoplastic resins can be used as Component (B) depending upon the purpose of use of the resin composition. Thermoplastic resins which are not compatible with Component (A) are preferably used as Component (B).

Preferred examples of thermoplastic resins for use as Component (B) include condensation polymers such as polyester (specifically, polyethylene terephthalate, polybutylene terephthalate, polyarylate, and the like), polycarbonate, polyether (polysulfone, polyethersulfone, polyphenylene ether, and the like polyamide (nylon 6, nylon 66, and the like) and polyoxymethylene; acrylate polymers such as polyacrylic acid, polyacrylic acid ester and polymethylmethacrylate; polyolefins such as polyethylene (low density polyethylene (LDPE), linear low density polyethylene (LLDPE), high density polyethylene (HDPE), and the like), polypropylene, polybutene-1, poly4-methylpentene-1 and ethylene-propylene copolymer; and halogen-containing polymers such as polyvinyl chloride, polyvinylidene chloride and polyvinylidene fluoride.

Various rubber-like polymers can be used as Component (C). The rubber-like polymers belonging to the following Groups(I), (II) or (III) are preferred.

Group (I)

Polymer in Group (I) are rubber-like polymers which are produced by polymerizing vinyl monomers in the presence of polymers obtained through polymerization of one or more monomer selected from the group consisting of alkyl acrylate, alkyl methacrylate and polyfunctional monomers containing a conjugated diene double bond. In the alkyl acrylate and the alkyl methacrylate, an alkyl group having 2 to 10 carbon atoms is suitable. Specific examples of the alkyl acrylate and the alkyl methacrylate are ethyl acrylate, butyl acrylate, 2-ethylhexyl acrylate and n-octyl methacrylate.

Examples of the polyfunctional monomers containing a conjugated diene type double bond are; conjugated diene compounds such as butadiene and isoprene, and compounds containing non-conjugated double bonds, as well as conjugated diene type double bonds, in the molecule thereof. Specific examples are 1-methyl-2-vinyl-4,6-heptadiene-i-ol, 7-methyl-3-methylene-1,6-octadiene, and 1,3,7-octatriene.

As Component (C), rubber-like polymers which are produced by polymerizing a vinyl monomer in the presence of polymers or copolymers obtained by polymerizing one of the above monomers or by copolymerizing two or more of the above monomers, i.e., graft copolymers of the vinyl monomer to the above polymers or copolymers are used. The vinyl monomer includes aromatic vinyl compounds such as styrene and α-methylstyrene, acrylic acid esters such as methyl acrylate and ethyl acrylate, methacrylic acid esters such as methyl methacrylate and ethyl methacrylate, vinyl cyanide compounds such as acrylonitrile and methacrylonitrile, and vinyl esters such as vinyl acetate and vinyl propionate. One or more of these monomers are graft polymerized.

Polymerization can be carried out by various methods such as bulk polymerization, suspension polymerization and emulsion polymerization. Polymers obtained by emulsion polymerization are particularly preferred.

In a first embodiment of the invention wherein Components (A), (B) and (C) are preferred, and Component (D) is optional, the following represent suitable definitions:

Suitable examples of the rubber-like polymers in Group (I) are shown below.

(1) Polymers obtained by polymerizing one or more of vinyl monomers in the presence of polymers containing alkyl acrylate and/or alkyl methacrylate (hereinafter referred to as "alkyl-acrylates") as main component.

Polymers containing alkyl acrylates as the main component are polymers obtained by polymerizing 70% or more by weight of alkyl acrylates and 30% or less by weight of other vinyl monomers copolymerizable with the alkyl acrylates, such as methyl methacrylate, acrylonitrile, vinyl acetate and styrene. Polymers obtained by using a suitable amount of a polyfunctional monomers, e.g., divinylbenzene, ethylene dimethacrylate, triallyl cyanurate and triallyl isocyanurate as a cross-linking agent are also included in the above polymers.

A specific example of rubber-like polymers belonging to (1) is an MAS elastomer, obtained by graft polymerizing styrene to a copolymer of methyl methacrylate and butyl acrylate in a latex form. Such MAS elastomers are commercially available as EXL-2330 (trade name, produced by Rohm & Haas Co., Ltd., USA), KM-330 (trade name, produced by Rohm & Haas Co., Ltd., USA) and M-101 (trade name, produced by Kanegafuchi Kagaku Kogyo Co., Ltd.).

(2) Graft polymers obtained by copolymerizing one or more vinyl monomers to copolymers of alkyl acrylate and/or alkyl methacrylate and polyfunctional polymerizable monomers containing conjugated diene-type double bonds. In preparation of the graft polymers, as in the case of (1) above, vinyl monomers and a cross-liking agent can be added.

Specific examples of the rubber-like polymers belonging to (2) are; MABS elastomers, e.g. a graft copolymer obtained by adding styrene and methyl methacrylate to a rubber latex which has been obtained by copolymerizing octyl acrylate and butadiene (7:3) and then graft polymerizing them, and MBS elastomers, e.g. a graft copolymer obtained by adding styrene to a rubber latex which has been obtained by copolymerizing methyl methacrylate and butadiene and graft polymerizing them. As the MBS elastomer, Metablen C-223 (trade name, produced by Mitsubishi Rayon Co., Ltd.) is commercially available.

(3) Other elastomers include; an AABS elastomer, obtained by adding acrylonitrile and styrene to a rubber latex which has been obtained by copolymerizing butadiene and alkyl acrylate, and then graft polymerizing them, and a SBR elastomer (trade name: Metablen IP-2, produced by Mitsubishi Rayon Co., Ltd.), obtained by graft polymerizing styrene to polybutadiene. These rubber-like polymers of Group I are core shell type rubbers and are solid rubbers having dispersibility in Component (A).

The particle size of the rubber-like polymer of Group I varies with the purpose of use of the composition or characteristics required therefor and cannot be determined unconditionally. In general, the average particle diameter (volume average particle diameter) of the rubber-like polymer in the composition is 0.1 to 4 μm and preferably 0.2 to 3 4 μm. Herein, volume average particle diameter (d) is defined by the following equation.

$$d=\Sigma d_i^4/\Sigma d_i^3$$

wherein $d_i$ stands for a diameter of the i-th particle.

Group (II)

Polymers in Group (II) are rubber-like elastomers comprising one or more copolymers selected from a-b type block copolymers, a-b-a type block copolymers, b-a-b type block copolymers, a grafted b copolymers and b grafted a copolymers.

As portion a of the a-b, a-b-a or b-a-b type block copolymer, atactic polystyrene is preferred. Compatibility of the a-b, a-b-a or b-a-b type block copolymer with the component (A) is markedly high within the preferred range. As portion b, one or more polymers selected from conjugated diene, hydrogenated product of conjugated diene, conjugated diene modified with acid anhydride and hydrogenated product of conjugated diene modified with acid anhydride can be given. Examples of portion b include butadiene, isoprene, hydrogenated butadiene, hydrogenated isoprene, butadiene modified with maleic anhydride, hydrogenated product of butadiene modified with maleic anhydride, isoprene modified with maleic anhydride and hydrogenated product of isoprene modified with maleic anhydride can be given.

Graft copolymers which can be used are indicated in terms of a grafted b copolymers or b grafted a copolymers.

Portion a generally exhibits good affinity (dispersibility) to component (A) in the block or graft copolymers comprising portions a and b. Examples of such rubber-like polymers are a styrene-butadiene block copolymer rubber (SB, SBS, BSB), rubbers obtained by partially or completely hydrogenating the butadiene portion of a styrene-butadiene block copolymer (SEBS, SEB), a styrene-isoprene block copolymer rubber (SI, SIS, ISI), rubbers obtained by partially or completely hydrogenating the isoprene portion of a styrene-isoprene block copolymer (SEP, SEPS), SBS modified with maleic anhydride, SEBS modified with maleic anhydride, SEP modified with maleic anhydride and SIS modified with maleic anhydride.

Since these copolymers all have the styrene unit, they have good dispersibility in the styrene-based polymers with mainly syndiotactic configuration as Component (A). Thus, physical properties are markedly improved.

When polyolefin, such as LDPE, LLDPE, HDPE, polypropylene (PP), polybutene-1 (PB-1) or poly4-methyl pentene-1 is used as thermoplastic resin of Component (B); SBS, SIS, SEBS, SEPS, SB, SI, BSB, ISI or hydrogenated product thereof is suitable as component (C). The reason for this is that the butadiene, isoprene, ethylene-butylene or ethylene-propylene portion ol the rubber-like polymer exhibits good affinity to the polyolefin, and that the styrene portion of the rubber-like polymer exhibits good affinity to Component (A).

When a thermoplastic resin having at least one polar substituent of an amino group, a carbonyl group and a hydroxy group at terminal position thereof, for example, polyester, polyether polyamide and polycarbonate is used as Component (B), maleated SBS (SBS modified with maleic anhydride), maleated SEBS, maleated SEP or maleated SIS is suitable as Component (C). The reason for this that the maleated butadiene, maleated isoprene, maleated ethylene-butadiene or maleated ethylene-propylene portion of the rubber-like polymer has polarity and thus exhibits good affinity to the thermoplastic resin having the polar substituent, and that the styrene portion has good affinity to Component (A).

Group (III)

Rubber-like polymers such as natural rubber, polybutadiene, polyisoprene, polyisobutylene, neoprene, ethylene-propylene copolymer rubber (EPR), ethylenepropylene-diene methylene linkage copolymer rubber (EPDM), polysulfide rubber, thiokol rubber, acryl rubber, urethane rubber, silicone rubber, epichlorohydrin rubber, polyetherester rubber, and polyesterester rubber. These rubbers are not compatible with the styrene-based polymers having mainly syndiotactic configuration as Component (A). They are preferably used depending on the purpose of use of the resin composition of the present invention.

When polyolefin, such as LDPE, LLDPE, HDPE, PP, PB-1 or poly4-methylpentene-1 is used as Component (B), EPR or EPDM is preferably used as rubber-like polymer of Group III.

Rubber-like polymers to be used as Component (c) can be divided into the above groups (I) to (III). However, it is to be noted that the groups are not strictly divided and partially overlap with each other. One or more rubber-like polymers are used. More specifically, depending on the purpose of use of the resin composition and characteristics required, two or more rubber-like polymers selected from the same group can be used in combination, or two or more rubber-like polymers selected from different groups can be used in combination.

The proportion of Component (A), (B) or (C) in the composition of the present invention is not critical and can be determined appropriately depending on the type of Component (B) or (C), the purpose of use of the composition, characteristics required therefor, and so forth. The composition usually comprises 2 to 98% by weight of Component (A) and 98 to 2% by weight of the total of Components (B) and (C), and preferably 10 to 95% by weight of Component (A) and 90 to 5% by weight of the total of Components (B) and (C).

In another embodiment of the present invention, the composition contains (D) an inorganic filler as well as Components (A), (B) and (C). The inorganic filler may be fibrous, granular or powder in the form. Examples of the fibrous filler are glass fiber, carbon fiber, and alumna fiber. Of these fiber, glass fiber and carbon fiber are particularly preferred. The shape of the glass fiber is cloth-like, mat-like, strand-like, short fiber-like, and filament-like. Of these fibers, strand-like glass fiber having a length of 0.05 to 13 mm and a fiber diameter of 5 to 15 μm is preferred. Most preferable is the strand-like glass fiber subjected to silane treatment.

As the carbon fiber, polyacrylonitrile (PAN)-based fiber is preferred. Bundles of the chopped PAN fiber with a length of about 3 mm and a diameter of 7 to 15 μm are more preferable.

Examples of granular or powder inorganic fillers are talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, and metal powder. Of these fillers, titanium dioxide is most preferable. The crystal form of titanium dioxide is rutile, brucite or anatase. Titanium dioxide of the rutile or anatase structure, having an average particle diameter of 0.15 to 0.40 μm is preferred. It may be treated with Zn, Al, Si and the like.

In cases where Component (D) is added, the proportion of Component (A), (B) or (C) can be chosen from a wide range. More specifically, the proportion of Component (A) in the composition is 1 to 98% by weight, preferably 5 to 98% by weight and most preferably 10 to 95% by weight, the total proportion of Components (B) and (C) is 1 to 98% by weight, preferably 3 to 95% by weight and most preferable 5 to 90% by weight. The proportion of Component (D) is 1 to 60% by weight, preferably 2 to 55% by weight and most preferably 3 to 50% by weight.

The composition of the present invention is essentially composed of Components (A), (B) and (C), or Components (A), (B), (C) and (D). If necessary, various additives such as a nucleating agent, an antioxidant, a plasticizer, an ultraviolet ray inhibitor, a lubricant, a coloring agent, an antistatic agent, a thermal stabilizer, a flame retardant and the like can be added. The composition of the present invention can be prepared by compounding Components (A), (B) and (C), and other components if necessary, and kneading the resulting mixture at a suitable temperature, e.g., 270 to 350° C., preferably 270 to 320° C. Compounding and kneading can be carried out by usual methods. More specifically, the melt kneading method using a kneader, a mixing roll, an extruder, a Vanbury mixer, a Henschel mixer and kneading roll, or the solution blending method can be employed.

The styrene-based resin composition of the present invention is excellent in heat resistance and at same time, in physical properties such as impact resistance, stiffness, tensile strength, and modulus in tension.

The styrene-based resin composition of the present invention is expected to be widely used as an industrial material for which heat resistance and various physical properties are required, particularly as raw material for injection molding or extrusion molding.

The present invention is described in greater detail with reference to the following examples.

REFERENCE EXAMPLE 1
(Preparation of Polystyrene having Syndiotactic Configuration)

2 L (L=liter) of toluene as a solvent, and 5 mmol of tetraethoxytitanium and 500 mmol (as aluminum atom) of methylaluminoxane as catalyst components were placed in a reactor, and 15 L of styrene was introduced thereinto and polymerized for 4 hours at 50° C.

After the completion of polymerization, the reaction product was washed with a mixture of hydrochloric acid and methanol to decompose and remove the catalyst components, and then dried to obtain 2.5 kg of a styrene polymer (polystyrene). The polymer was subjected to Soxhlet extraction using methyl ethyl ketone as a solvent to obtain 95% by weight of an extraction residue. The weight average molecular weight of the polymer was 800,000. A $^{13}$C-NMR analysis (solvent: 1,2-dichlorobenzene) showed an absorption at 145.35 ppm, ascribable to the syndiotactic configuration, and the syndiotacticity indicated in terms of racemi pentad as calculated from the peak area was 96%.

EXAMPLE 1

100 parts by weight of a mixture consisting of 66.7% by weight of the polystyrene having syndiotactic configuration as obtained in Reference Example 1, 28.6% by weight of linear low density polyethylene (trade name: Idemitsu Polyethylene L1014D, produced by Idemitsu Petrochemical Co., Ltd.) as a thermoplastic resin, and 4.7% by weight of a styrene-hydrogenated butadiene block copolymer (trade name: G1652. produced by Shell Chemical Co., Ltd.) were kneaded in a single-screw extruder having an inner diameter of 25 mm and injection molded by the use of a minimat molding machine to form a test piece, which was then measured for mechanical strength. The Vicat softening temperature was measures according to JIS-K7206. The results are shown in Table 1.

EXAMPLE 2

The procedure of Example 1 was repeated with the exception that a mixture of 66.7% by weight of the polystyrene having syndiotactic configuration, 28.6% by weight of high density polyethylene trade name: Idemitsu Polyethylene 110J, produced by Idemitsu Petrochemical Co., Ltd.) as a thermoplastic resin and 4.7% by weight of a styrene-hydrogenated butadiene block copolymer (trade name: G-1652, produced by Shell Chemical Co., Ltd.) as a rubber-like polymer was used. The results are shown in Table 1.

EXAMPLE 3

The procedure of Example 1 was repeated with the exception that a mixture of 69.3% by weight of the polystyrene having syndiotactic configuration, 29.7% by weight of polypropylene (trade name: Idemitsu Polypropylene J-700G, produced by Idemitsu Petrochemical Co., Ltd.) as a thermoplastic resin and 1.0% by weight of a styrene-hydrogenated butadiene block copolymer (trade name: G-1652, produced by Shell Chemical Co., Ltd.) as a rubber-like polymer was used. The results are shown in Table 1.

TABLE 1

| No. | Modulus in Tension (kg/cm$^2$) | Tensile Strength (kg/cm$^2$) | Izod Impact Strength (notched) (kg · cm/cm) | Vicat Softening Temperature (°C.) |
|---|---|---|---|---|
| Example 1 | 22000 | 560 | 5.2 | 215 |
| Example 2 | 28000 | 538 | 6.7 | 230 |
| Example 3 | 28000 | 529 | 3.0 | 215 |

REFERENCE EXAMPLE 2
(Production of Polystyrene having Mainly syndiotactic Cionfiguration)

2 L of toluene as a solvent, and 5 mmol of tetraethoxytitanium and 500 mmol (as aluminum atom) of methylaluminoxane as catalyst components were placed in a reactor, and 15 L of styrene was introduced thereinto and polymerized for 4 hours at 55° C.

After the completion of polymerization, the reaction product was washed with a mixture of hydrochloric acid and methanol to decompose and remove the catalyst components, and then dried to obtain 2.5 kg of a styrene polymer (polystyrene). The polymer was subjected to Soxhlet extraction using methyl ethyl ketone as a solvent to obtain 97% by weight of an extraction residue. The weight average molecular weight of the extraction residue was 400,000. A $^{13}$C-NMR analysis (solvent: 1,2-dichlorobenzene) of the polymer showed an absorption at 145.35 ppm, ascribable to the syndiotactic configuration, and the syndiotacticity indicated in terms of racemicpentad as calculated from the peak area was 98%.

EXAMPLE 4

75 parts of weight of the polystyrene having mainly syndiotactic configuration obtained in Reference Example 2, 25 parts by weight of block polypropylene (trade name; Idemitsu Polypro J785H, produced by Idemitsu Petrochemical Co., Ltd.) having melt index of 10 g/10 min. and containing 15% by weight of EPR rubber as a thermoplastic resin, and 15 parts by weight of SEP (trade name; Kraton GX-1701, produced by Shell Clemical Co., Ltd.) as a rubber-like polymer were kneaded in a single-screw extruder having an inner diameter of 20 mm at the temperature of 290° C. and pelletized. The pellets were injection-molded by an injection-molder MIN-7 produced by Niigata Tekko Co., Ltd. The Izod impact strength according to JIS-K7110, the tensile strength according to JIS-K7203 and the Vicat softening point according to JIS-K7206 were measured. The results are shown in Table 2.

EXAMPLE 5

The procedure of Example 4 was repeated with the exception that 50 parts by weight of the polystyrene having mainly syndiotactic configuration obtained in Reference Example 2, 50 parts by weight of block polypropylene (trade name; Idemitsu Polypro J785H, produced by Idemitsu Petrochemical Co., Ltd.) having melt index of 10 g/10 min. and containing 15% by weight of EPR rubber as a thermoplastic resin, and 15 parts by weight of SEP (trade name; Kraton GX-1701, produced by Shell Chemical Co., Ltd.) as a rubber-like polymer were used. The results are shown in Table 2.

COMPARATIVE EXAMPLE 1

The procedure of Example 4 was repeated with the exception that 100 parts by weight of the polystyrene having mainly syndiotactic configuration obtained in Reference Example 2, and 15 parts by weight of SEP (trade name; Kraton GX-1701, produced by Shell Chemical Co., Ltd.) as a rubber-like polymer were used and a block polypropylene as a thermoplastic resin was not used. The results are shown in Table 2.

COMPARATIVE EXAMPLE 2

The procedure of Example 4 was repeated with the exception that 50 parts by weight of the polystyrene having mainly syndiotactic configuration obtained in Reference Example 2 and 50 parts by weight of the block polypropylene (trade name; Idemitsu Polypro J785H) as a thermoplastic resin were used and a rubber-like polymer was not used. The results are shown in Table 2.

EXAMPLE 6

75 parts by weight of the polystyrene having mainly syndiotactic configuration obtained in Reference Example 2, 25 parts by weight of block polypropylene (trade name; Idemitsu Polypro J785H, produced by Idemitsu Petrochemical Co., Ltd.) having melt index of 10 g/10 min. and containing 15% by weight of EPR rubber as a thermoplastic resin, and 15 parts by weight of SIS (trade name; Kraton D-1111, produced by Shell Chemical Co., Ltd.) as a rubber-like polymer and 1.15 parts of the Sumilizer GM produced by Sumitomo Chemical Co., Ltd. as an antioxidant were kneaded in a single-screw extruder having an inner diameter of 20 mm at the temperature of 280° C. and pelletized. The procedure of Example 4 was repeated. The results are shown in Table 2.

EXAMPLE 7

The procedure of Example 6 was repeated with the exception that 50 parts by weight of the polystyrene having mainly syndiotactic configuration obtained in Reference Example 2, 50 parts by weight of block polypropylene (trade name; Idemitsu Polypro J785H, produced by Idemitsu Petrochemical Co., Ltd.) having melt index of 10 g/10 min. and containing 15% by weight of EPR rubber as thermoplastic resin, and 15 parts by weight of SIS (trade name; Kraton D-1111, produced by Shell Chemical Co., Ltd.) as a rubber-like polymer and 1.15 parts of the Sumilizer GM produced by Sumitomo Chemical Co., Ltd. as an antioxidant were used. The results are shown in Table 2.

EXAMPLE 8

The procedure of Example 6 was repeated with the exception that 25 parts by weight of the polystyrene having mainly syndiotactic configuration obtained in Reference Example 2, 75 parts by weight of block polypropylene (trade name; Idemitsu Polypro J785H, produced by Idemitsu Petrochemical Co., Ltd.) having melt index of 10 g/10 min. and containing 15% by weight of EPR rubber as thermoplastic resin, and 15 parts by weight of SIS (trade name; Kraton D-1111 produced by Shell Chemical Co., Ltd.) as a rubber-like polymer and 1.15 parts of the Sumilizer GM produced by Sumitomo Chemical Co., ltd. as an antioxidant were used. The results are shown in Table 2.

EXAMPLE 9

The procedure of Example 6 was repeated with the exception that 75 parts by weight of the polystyrene having mainly syndiotactic configuration obtained in Reference Example 2, 25 parts by weight of block polypropylene (trade name; Idemitsu Polypro J785H, produced by Idemitsu Petrochemical Co., Ltd.) having melt index of 10 g/10 min. and containing 15% by weight of EPR rubber as thermoplastic resin, and 15 parts by weight of SEBS (trade name; Kraton G-1650, produced by Shell Chemical Co., Ltd.) as a rubber-like polymer were used. The results are shown in Table 2.

EXAMPLE 10

82.7 parts by weight of the polystyrene having mainly syndiotactic configuration obtained in Reference Example 2, 17.3 parts by weight of linear low density polyethelene (trade name; Idemitsu Moatec 0138N produced by Idemitsu Petrochemical Co., Ltd.) as a thermoplastic resin and 7.7 parts by weight of SEBS (trade name; Kraton G-1650, produced by Shell Chemical Co., Ltd.) as a rubber-like polymer were kneaded in a twin-screw extruder having an inner diameter of 20 mm at the temperature of 290° C. and pelletized. The pellets were injection-molded by an injection-molder MIN-7 produced by Niigata Tekko Co., Ltd. The Izod impact strength according to JIS-K7110, the tensile strength according to JIS-K7113, and the Vicat softening point according to JIS-K7206 were measured. The results are shown in Table 3.

COMPARATIVE EXAMPLE 3

The procedure of Example 10 was repeated with the exception that 82.7 parts by weight of the polystyrene having mainly syndiotactic configuration obtained in Reference Example 3 and 17.3 parts by weight of the linear low density polyethelene (trade name; Idemitsu Moatec 0138N, produced by Idemitsu Petrochemical Co., Ltd.) were used and the SEBS was not used. The results are shown in Table 3.

TABLE 2

| No. | Modulus in Tension (kg/cm$^2$) | Tensile Strength (kg/cm$^2$) | Izod Impact Strength (notched) (kg · cm/cm) | Vicat Softening Temperature (°C.) |
|---|---|---|---|---|
| Example 4 | 21000 | 430 | 8.6 | 152 |
| Example 5 | 17000 | 370 | 8.5 | 140 |
| Comparative Example 1 | 31000 | 780 | 2.3 | 245 |
| Comparative Example 2 | 20000 | 350 | 1.8 | 138 |
| Example 6 | 20000 | 410 | 6.1 | 167 |
| Example 7 | 15000 | 330 | 8.2 | 142 |
| Example 8 | 12000 | 270 | 5.2 | 142 |
| Example 9 | 23000 | 560 | 4.8 | 158 |

TABLE 3

| No. | Elongation at Breakage (%) | Izod Impact Strength (notched) (kg · cm/cm$^2$) | Vicat Softening Temperature (°C.) |
|---|---|---|---|
| Example 10 | 6.4 | 3.1 | 227 |
| Comparative Example 3 | 2.3 | 1.8 | 230 |

EXAMPLE 11

30 parts by weight of the polystyrene having mainly syndiotactic configuration obtained in Reference Example 2, 70 parts by weight of Nylon 66 (trade name; UBE Nylon 2023, produced by Ube Kosan Co., Ltd.) as a thermoplastic resin, and 20 parts by weight of SEBS modified with maleic acid (trade name; Kraton FG1901X, produced by Shell Chemical Co., Ltd.) as a rubber-like polymer were kneaded in a twin-screw extruder having an inner diameter of 20 mm at the temperature of 300° C. and pelletized. The pellets were injection-molded by an injection-molder MIN-7 produced by Niigata Tekko Co., Ltd. The Izod impact strength was measured according to JIS-K7110. After the test piece for the Izod impact strength was completely soaked and boiled in a boiling water for 8 hours, weight change rate was measured. The results are shown in Table 4.

COMPARATIVE EXAMPLE 4

The procedure of Example 11 was repeated with the exception that 100 parts by weight of the polystyrene having mainly syndiotactic configuration obtained in Reference Example 2 and 20 parts by weight of SEBS modified with maleic acid (trade name; Kraton FG1901X, produced by Shell Chemical Co., Ltd.) as a rubber-like polymer were used and Nylon 66 was not used. The results are shown in Table 4.

COMPARATIVE EXAMPLE 5

Only Nylon 66 (UBE Nylon 2023, produced by Ube Kosan Co., Ltd.) was injection-molded. The evaluation of Example 11 was repeated. The results are shown in Table 4.

TABLE 4

| No. | Izod impact Strength (notched, room temperature) (kg · cm/cm$^2$) | Ratio of[*1] Weight Change (%) |
|---|---|---|
| Example 11 | 13.5 | +3.1 |
| Comparative Example 4 | 2.1 | +1.5 |
| Comparative Example 5 | 5.0 | +8.1 |

[*1]Ratio of Weight change (%) =

$$100 \times \frac{\text{weight of test piece after soakage (g)} - \text{weight of test piece before soakage (g)}}{\text{weight of test piece before soakage (g)}}$$

EXAMPLE 12

56 parts by weight of the polystyrene having mainly syndiotactic configuration obtained in Reference Example 2, 30 parts by weight of Polyarylate produced by Du Pont Co., Ltd. as a thermoplastic resin and 14 parts by weight of MBS rubber (trade name; Metablen IP-13, produced by Mitsubishi Rayon Co., Ltd.) as a rubber-like polymer were kneaded in a single-screw extruder having an inner diameter of 20 mm at the temperature of 300° C. and pelletized. The pellets were injection-molded by an injection-molder MIN-7 produced by Niigata Tekko Co., Ltd. The tensile strength according to JIS-K7203 and the heat distortion temperature according to JIS-K7270 were measured. The results are shown in Table 5.

COMPARATIVE EXAMPLE 6

The procedure of Example 12 was repeated with the exception that 80 parts by weight of the polystyrene having mainly syndiotactic configuration obtained in Reference Example 2 and 20 parts by weight of MBS rubber (trade name; Metablen IP-13, produced by Mitsubishi Rayon Co., Ltd.) as a rubber-like polymer were used and polyarylate was not used. The results are shown in Table 5.

COMPARATIVE EXAMPLE 7

The procedure of Example 12 was repeated with the exception that only Polyarylate produced by Du Pont Co., Ltd. was injection-molded. The results are shown in Table 5.

TABLE 5

| No. | Modulus in Tension (kgf/cm$^2$) | Heat Distortion Temperature (low load) (°C.) | Vicat Softening Temperature (°C.) |
|---|---|---|---|
| Example 12 | 28500 | 165 | 240 |
| Comparative Example 6 | 27000 | 110 | 255 |
| Comparative Example 7 | 23000 | 180 | 190 |

REFERENCE EXAMPLE 3
(Production of Polystyrene having Mainly Syndiotactic Configuration)

2 L of toluene as a solvent, and 1 mmol of cyclopentadienyltitanium trichloride and 0.8 mol (as aluminum atom)

of methylaluminoxane as catalyst components were placed in a reactor, and 3.6 L of styrene was added and polymerized at 20° C. for one hour. After the completion of polymerization, the reaction product was washed with a mixture of hydrochloric acid and methanol to decompose and remove the catalyst components, and then dried to obtain 330 g of a polymer.

This polymer was subjected to Soxhlet extraction using methyl ethyl ketone as a solvent to obtain 95% by weight of an extraction residue. The polymer (extraction residue) had a weight average molecular weight of 290,000, a number average molecular weight of 158,000 and a melting point of 270° C. A $^{13}$C-NMR analysis of the polymer showed an absorption at 145.35 ppm, ascribable to the syndiotactic structure, and the syndiotacticity indicated in terms of pentad as calculated from the peak area was. 96%.

EXAMPLE 13

75 parts by weight of the polystyrene having mainly syndiotactic configuration obtained in Reference Example 3, 25 parts by weight of block polypropylene (trade name; Idemitsu Polypro J785H, produced by Idemitsu Petrochemical Co., Ltd.) having melt index of g/10 min. and containing 15% by weight of EPR rubber as a thermoplastic resin, 5 parts by weight of SIS (trade name; Kraton D-1111) as a rubber-like polymer, 0.5 parts by weight of Sumilizer GM produced Sumitomo Chemical Co., Ltd. as an antioxidant and 45 parts by weight of glass fiber having an average fiber length of 3 mm (produced by Asahi Fiberglass Co., Ltd., fiber diameter: 10 to 15 mm, chopped strand form) were dry blended, and then kneaded in an extruder and pelletized to form a test piece, which was them measured for mechanical strength and the heat distortion temperature (high load). The results are shown in Table 6.

EXAMPLE 14

The procedure of Example 13 was repeated with the exception that 50 parts by weight of the polystyrene having mainly syndiotactic configuration obtained in Reference Example 3, 50 parts by weight of block polypropylene (trade name; Idemitsu Polypro J785H, produced by Idemitsu Petrochemical Co., Ltd.) having melt index of 10 g/10 min. and containing 15% by weight of EPR rubber as thermoplastic resin, 5 parts by weight of SEP (trade name; Kraton GX-1701, produced by Shell Chemical Co., Ltd.) as a rubber-like polymer, and 45 parts by weight of glass fiber having an average fiber length of 3 mm produced Asahi Fiberglass Co., Ltd. were used. The results are shown in Table 6.

COMPARATIVE EXAMPLE 8

The procedure of Example 13 was repeated with the exception that 70 parts by weight of block polypropylene (trade name; Idemitsu Polypro J785H, produced by Idemitsu Petrochemical Co., Ltd.) having melt index of g/10 min. and containing 15% by weight of EPR rubber as a thermoplastic resin, and 30 parts by weight of glass fiber having an average fiber length of 3 mm produced by Asahi Fiberglass Co., Ltd. were used and the polystyrene having syndiotactic configuration and a rubber-like polymer were not used. The results are shown in Table 6.

TABLE 6

| No. | Modulus in Tension (kgf/cm$^2$) | Tensile strength (kgf/cm$^2$) | Heat Distortion Temperature (°C.) |
| --- | --- | --- | --- |
| Example 13 | 93000 | 1300 | 210 |
| Example 14 | 73000 | 1200 | 170 |
| Comparative Example 8 | 52000 | 1100 | 151 |

The present invention also relates to a styrene-based resin composition containing the above Components (A) and (B), and an inorganic filler (D) as the main components.

In a related embodiment, the resin composition of the invention contains Components (A) and (C) as required main components. These are generally as described above. More specifically, however:

Component (A) is a styrene-based resin with mainly syndiotactic configuration. The styrene-based resin with mainly syndiotactic configuration refers to a polymer with mainly stereo structure such that phenyl groups or substituted phenyl groups as side chains are located alternately at opposite positions relative to the main chain composed of carbon-carbon bonds. The tacticity is quantitatively determined by a nuclear magnetic resonance method using a carbon isotope ($^{13}$C-NMR method). The tacticity as determined by the $^{13}$C-NMR method is indicated in terms of proportions of structural units continuously connected to each other, i.e., a diad in which two structural units are connected to each other, a triad in which three structural units are connected to each other, and a pentad in which five structural units are connected to each other. The styrene-based resin with mainly syndiotactic configuration has syndiotactic configuration such that the proportion in a diad is at least 75% and preferably at least 85%, or the proportion in a pentad (racemic pentad) is at least 30% and preferably at least 50%. The styrene-based resin includes polystyrene, poly(alkylstyrene), poly(halogenated styrene), poly(alkoxystyrene), poly(vinyl benzoate), and their mixtures, and copolymers containing the above polymers as main components.

The poly(alkylstyrene) includes polymethylstyrene, polyethylstyrene, polyisopropylstyrene, and poly(tert-butylstyrene). The poly(halogenated styrene) includes polychlorostyrene, polybromostyrene, and polyfluorostyrene. The poly(alkoxystyrene) includes polymethoxystyrene and polyethoxystyrene. Of these polymers, polystyrene, poly(p-methylstyrene), poly(m-methylstyrene), poly(p-tert-butylstyrene), poly(p-chlorostyrene), poly(m-chlorostyrene), poly(p-fluorostyrene), and a copolymer of styrene and p-methylstyrene are most preferable.

The styrene-based resin to be used in the present invention is not critical in molecular weight. The weight average molecular weight is preferably at least 10,000 and particularly preferably at least 50,000. The molecular weight distribution is not critical and may be narrow or wide.

The styrene-based resin to be used in the present invention can be produced, for example, by polymerizing a styrene-based monomer (corresponding to the above styrene-based resin) with the use of a catalyst containing a titanium compound, and a condensate of water and trialkylaluminum in the presence of an inert hydrocarbon solvent or in the absence of a solvent (Japanese Patent Application Laid-Open No. 187708/1987).

Various rubber-like polymers can be used as Component (C). The rubber-like polymers belonging to the following Groups(I),(II) or (III) are preferred.

Group (I)

Polymer in Group (I) are rubber-like polymers which are produced by polymerizing vinyl monomers in the presence of polymers obtained through polymerization of one or more monomer selected from the group consisting of alkyl acrylate, alkyl methacrylate and polyfunctional monomers containing a conjugated diene double bond. In the alkyl acrylate and the alkyl methacrylate, an alkyl group having 2 to 10 carbon atoms is suitable. Specific examples of the alkyl acrylate and the alkyl methacrylate are ethyl acrylate, butyl acrylate, 2-ethylhexyl acrylate and n-octyl methacrylate.

Examples of the polyfunctional monomers containing a conjugated diene type double bond are; conjugated diene compounds such as butadiene and isoprene, and compounds containing non-conjugated double bonds, as well as conjugated diene type double bonds, in the molecule thereof. Specific examples are 1-methyl-2-vinyl-4,6-heptadiene-l-ol 7-methyl-3-methylene-1,6-octadiene, and 1,3,7-octatriene.

As Component (C), rubber-like polymers which are produced by polymerizing a vinyl monomer in the presence of polymers or copolymers obtained by polymerizing one of the above monomers or by copolymerizing two or more of the above monomers, i.e., graft copolymers of the vinyl monomer to the above polymers or copolymers are used. The vinyl monomer includes aromatic vinyl compounds such as styrene and α-methylstyrene, acrylic acid esters such as methyl acrylate and ethyl acrylate, methacrylic acid esters such as methyl methacrylate and ethyl methacrylate, vinyl cyanide compounds such as acrylonirtrile and methacrylonitrile, and vinyl esters such as vinyl acetate and vinyl propionate. One or more of these monomers are graft polymerized.

Polymerization can be carried out by various methods such as bulk polymerization, suspension polymerization and emulsion polymerization. Polymers obtained by emulsion polymerization are particularly preferred.

Suitable examples of the rubber-like polymers in Group (I) are shown below.

(1) Polymers obtained by polymerizing one or more of vinyl monomers in the presence of polymers containing alkyl acrylate and/or alkyl methacrylate (hereinafter referred to as "alkyl-acrylates") as main component.

Polymers containing alkyl acrylates as the main component are polymers obtained by polymerizing 70% or more by weight of alkyl acrylates and 30% or less by weight of other vinyl monomers copolymerizable with the alkyl acrylates, such as methyl methacrylate, acrylonitrile, vinyl acetate and styrene. Polymers obtained by using a suitable amount of a polyfunctional monomers, e.g., divinylbenzene, ethylene dimethacrylate, triallyl cyanurate and triallyl isocyanurate as a cross-linking agent are also included in the above polymers.

A specific example of rubber-like polymers belonging to (1) is an MAS elastomer, obtained by graft polymerizing styrene to a copolymer of methyl methacrylate and butyl acrylate in a latex form. Such MAS elastomers are commercially available as EXL-2330 (trade name, produced by Rohm & Haas Co., Ltd., USA), KM-330 (trade name, produced by Rohm & Haas Co., Ltd., USA) and M-101 (trade name, produced by Kanegafuchi Kagaku Kogyo Co., Ltd.).

(2) Graft polymers obtained by copolymerizing one or more vinyl monomers to copolymers of alkyl acrylate and/or alkyl methacrylate and polyfunctional polymerizable monomers containing conjugated diene-type double bonds. In preparation of the graft polymers, as in the case of (1), vinyl monomers and a cross-liking agent can be added.

Specific examples of the rubber-like polymers belonging to (21 are; MABS elastomers, e.g. a graft copolymer obtained by adding styrene and methyl methacrylate to a rubber latex which has been obtained by copolymerizing octyl acrylate and butadiene (7:3) and then graft polymerizing them, and MBS elastomers, e.g. a graft copolymer obtained by adding styrene to a rubber latex which has been obtained by copolymerizing methyl methacrylate and butadiene and graft polymerizing them. As the MBS elastomer, Metablen C-223 (trade name, produced by Mitsubishi Rayon Co., Ltd.) is commercially available.

(3) Other elastomers include; an AABS elastomer, obtained by adding acrylonitrile and styrene to a rubber latex which has been obtained by copolymerizing butadiene and alkyl acrylate, and then graft polymerizing them, and a SBR elaster (trade name: Metablen IP-2, produced by Mitsubishi Rayon Co., Ltd.), obtained by graft polymerizing styrene to polybutadiene.

Group (II)

Polymers in Group (II) are rubber-like elastomers comprising one or more copolymers selected from a-b type block copolymers, a-b-a type block copolymers, b-a-b type block copolymers, a grafted b copolymers and b grafted a copolymers.

As portion a of the a-b, a-b-a or b-a-b type block copolymer, atactic polystyrene is preferred. Compatibility of the a-b, a-b-a or b-a-b type block copolymer with the component (A) is markedly high within the preferred range. As portion b, one or more polymers selected from conjugated diene, hydrogenated product of conjugated diene, conjugated diene modified with acid anhydride and hydrogenated product of conjugated diene modified with acid anhydride can be given. Examples of portion b include butadiene, isoprene, hydrogenated butadiene, hydrogenated isoprene, butadiene modified with maleic anhydride, hydrogenated product of butadiene modified with maleic anhydride, isoprene modified with maleic anhydride and hydrogenated product of isoprene modified with maleic anhydride can be given.

Graft copolymers which can be used are indicated in terms of a grafted b copolymers or b grafted a copolymers.

Portion a generally exhibits good affinity (dispersibility) to Component (A) in the block or graft copolymers comprising portions a and b. Examples of such rubber-like polymers are a styrene-butadiene block copolymer rubber (SB, SBS), rubbers obtained by partially or completely hydrogenating the butadiene portion of a styrene-butadiene block copolymer (SEBS), a styrene-isoprene block copolymer rubber (SI, SIS), rubbers obtained by partially or completely hydrogenating the isoprene portion of a styrene-isoprene block copolymer (SEP, SEPS), SBS modified with maleic. anhydride and SEBS modified with maleic anhydride.

Since these copolymers all have the styrene unit, they have good dispersibility in the styrene-based polymers with mainly syndiotactic configuration as Component (A). Thus, physical properties are markedly improved.

Group (III)

Rubber-like polymers such as natural rubber, polybytadiene, polyisoprene, polyisobutylene, neoprene, ethylene-propylene copolymer rubber, ethylene-propylene-diene methylene linkage copolymer rubber (EPDM), polysulfide rubber, thiokol rubber, acryl rubber, urethane rubber, silicone rubber, epichlorohydrin rubber, polyether-ester rubber, and polyesterester rubber. These rubbers are not compatible with the styrene-based polymers having mainly syndiotactic configuration as Component (A). They are preferably used depending on the purpose of use of the resin composition of the present invention.

Rubber-like polymers to be used as Component (C) can be divided into the above groups (I) to (III). However, it is to be noted that the groups are not strictly divided and partially overlap with each other. One or more rubber-like polymers are used. More specifically, depending on the purpose of use of the resin composition and characteristics required, two or more rubber-like polymers selected from the same group can be used in combination, or two or more rubber-like polymers selected from different groups can be used in combination.

For example, when a rubber-like polymer belonging to Group (II) and a rubber-like polymer belonging to Group (III) are used in combination, they are chosen by considering that portion a of the rubber-like polymer of Group (II) exhibits good compatibility with Component (A; and portion b exhibits good compatibility with the rubber-like polymer of Group (III). If the rubber-like polymers of Groups (II) and (III). are used in combination, the compatibility between Components (A) and (C) is increased and the physical properties of the composition are effectively improved. The amount of the rubber-like polymer of Group (II) can be determined appropriately; it is preferably 0.05 to 50 parts by weight, more preferably 0.5 to 20 parts by weight per 100 parts of the total weight of Component (A) and the rubber-like polymer of Group (III). The amount of the rubber-like polymer of Group (II) is 5 to 95%, preferably 10 to 90% based on the total weight of the rubber-like polymers of Groups (II) and (III).

The particle size of the rubber-like polymer varies with the purpose of use of the composition or characteristics required therefor and cannot be determined unconditionally. In general, the average particle diameter (volume average particle diameter) of the rubber-like polymer in the composition is 0.1 to 4 μm and preferably 0.2 to 3 μm. Herein, volume average particle diameter (d) is defined by the following equation.

$$d = \Sigma d_i^4 / \Sigma d_i^3,$$

wherein $d_i$ stands for a diameter of the i-th particle.

The proportion of Component (A) or (C) in the composition of the present invention is not critical and can be determined appropriately depending on the type of Component (C), the purpose of use of the composition, characteristics required therefor, and so forth. The composition usually comprises 65 to 99% by weight of Component (A) and 35 to 1% by weight of Component (C), and preferably 70 to 95% by weight of Component (A) and 30 to 5% by weight of Component (C).

In another embodiment of the present invention, the composition contains an inorganic filler (D) as well as Components (A) and (C). The inorganic filler may be fibrous, granular or powder in the form. Examples of the fibrous filler are glass fiber, carbon fiber, and alumna fiber. Of these fiber, glass fiber and carbon fiber are particularly preferred. The shape of the glass fiber is cloth-like, mat-like, strand-like, short fiber-like, and filament-like. Of these fibers, strand-like glass fiber having a length of 0.05 to 13 mm and a fiber diameter of 5 to 15 μm is preferred. Most preferable is the strand-like glass fiber subjected to silane treatment.

As the carbon fiber, polyacrylonitrile (PAN)-based fiber is preferred. Bundles of the chopped PAN fiber with a length of about 3 mm and a diameter of 7 to 15 μm are more preferable.

Examples of granular or powder inorganic fillers are talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, and metal powder. Of these fillers, titanium dioxide is most preferable. The crystal form of titanium dioxide is rutile, brucite or anatase. Titanium dioxide of the rutile or anatase structure, having an average particle diameter of 0.15 to 0.40 μm is preferred. It may be treated with Zn, Al, Si and the like.

In cases where Component (D) is added, the proportion of Component (A) or (C) can be chosen from a wide range. More specifically, the proportion of the component (A) in the composition is 1 to 98% by weight, preferably S to 95% by weight and most preferably 10 to 90% by weight. the proportion of Component (C) is 1 to 98% by weight, preferably 5 to 95% by weight and most preferable 20 to 80% by weight. The proportion of Component (D) is 1 to 60% by weight, preferably 5 to 50% by weight and most preferably 10 to 40% by weight.

The composition of the present invention is essentially composed of Components (A) and (C), or Components (A), (C) and (D). If necessary, various additives such as a nucleating agent, an antioxidant, a plasticizer, an ultraviolet ray inhibitor, a lubricant, a coloring agent, an antistatic agent, a thermal stabilizer, a flame retardant and the like can be added.

The composition of the present invention can be prepared by compounding Components (A) and (C), and other components if necessary, and kneading the resulting mixture at a suitable temperature, e.g., 270 to 320° C. Compounding and kneading can be carried out by usual methods. More specifically, the melt kneading method using a kneader, a mixing roll, an extruder, a Vanbury mixer, a Henschel mixer and kneading roll, or the solution blending method can be employed.

The styrene-based resin composition of the present invention is excellent in heat resistance and at same time, in physical properties such as impact resistance, stiffness, tensile strength, and modulus in tension.

The styrene-based resin composition of the present invention is expected to be widely used as an industrial material for which heat resistance and various physical properties are required, particularly as raw material for injection, molding or extrusion molding.

The present invention is described in greater detail with reference to the following examples.

REFERENCE EXAMPLE 1 (Same as above)
(Preparation of Polystyrene having Syndiotactic Configuration)

2 L (L=liter) of toluene as a solvent, and 5 mmol of tetraethoxytitanium and 500 mmol (as aluminum atom) of methylaluminoxane as catalyst components were placed in a reactor, and 15 L of styrene was introduced thereinto and polymerized for 4 hours at 50° C.

After the completion of polymerization, the reaction product was washed with a mixture of hydrochloric acid and methanol to decompose and remove the catalyst components, and then dried to obtain 2.5 kg of a styrene polymer (polystyrene). The polymer was subjected to Soxhlet extraction using methyl ethyl ketone as a solvent to obtain 95% by weight of an extraction residue. The weight average molecular weight of the polymer was 800,000. A $^{13}$C-NMR analysis (solvent: 1,2-dichlorobenzene) showed an absorption at 145.35 ppm, ascribable to the syndiotactic configuration, and the syndiotacticity indicated in terms of racemi pentad as calculated from the peak area was 96%.

EXAMPLE 1A 90 parts by weight of the polystyrene having syndiotactic configuration obtained in Reference Example 1, 10 parts by weight of a styrene-hydrogenated butadiene block copolymer (trade name: G-1652, produced by Shell Chemical Co., Ltd.) as a rubber-like polymer, 0.1 part by weight of bis(2,4di-tert-butylphenyl)pentaerythritol diphosphite, 0.7 part by weight of tetraquis (methylene(3,5-di-tert-butyl-4-hydroxyhydrocinnamate))methane, and 0.5 part by weight of talc having an average particle diameter of 0.5 μm were kneaded and pelletized by the use of a twin-screw extruder. These pellets were injection molded to form a test piece, which was then measured for Izod impact strength (notched) and modulus in tension. The results are shown in Table 1A.

EXAMPLES 2A and 3A

The procedure of Example 1A was repeated with the exception that the proportions of the polystyrene having syndiotactic configuration as obtained in Reference Example 1 and the styrene-hydrogenated butadiene block copolymer (trade name: G-1652, produced by Shell Chemical Co., Ltd.) as the rubber-like polymer were changed as shown in Table 1A. The results are shown in Table 1A.

COMPARATIVE EXAMPLE 1A

The procedure of Example 1A was repeated with the exception that the styrene-hydrogenated butadiene block copolymer was not used. The results are shown in Table 1A.

EXAMPLE 4A

The procedure of Example 2A was repeated with the exception that a methyl methacrylate-butyl acrylate-styrene copolymer (trade name: KM330, produced by Rhom & Haas Co.,Ltd., USA) was used as the rubber-like polymer. The results are shown in Table 1A.

EXAMPLE 5A

The procedure of Example 2A was repeated with the exception that a styrene-butadiene block copolymer (trade name: TR-1102, produced by Shell Chemical Co., Ltd.) was used as the rubber-like polymer. The results are shown in Table 1A.

EXAMPLE 6A

The procedure of Example 2A was repeated with the exception that polybutadiene (trade name: NF35AS, produced by Asahi Kasei Co., Ltd.) was used as the rubber-like polymer. The results are shown in Table 1A.

TABLE 1A

| | Composition | | | Physical Properties | |
|---|---|---|---|---|---|
| | | Rubber-Like Polymer | | | |
| No. | Styrene Polymer (wt %) | Type | Amount (wt %) | Volume Average Particle Diameter (μm) | Izod Impact Strength (notched) (kg · cm/cm) | Modulus in Tension (kg/cm$^2$) |
| Example 1 A | 90 | SEBS*[1] | 10 | 2.0 | 4.2 | 38000 |
| Example 2 A | 80 | SEBS | 20 | 2.5 | 7.3 | 34000 |
| Example 3 A | 70 | SEBS | 30 | 3.0 | 12.1 | 30000 |
| Example 4 A | 80 | MAS*[2] | 20 | 0.3 | 8.0 | 35000 |
| Example 5 A | 80 | SBS*[3] | 20 | 2.5 | 5.4 | 32000 |
| Example 6 A | 80 | Polybutadiene | 20 | 3.5 | 3.8 | 30000 |
| Comparative Example 1 A | 100 | — | — | — | 2.2 | 40000 |

*[1]Styrene-hydrogenated butadiene block copolymer
*[2]Methyl methacrylate-butyl acrylate-styrene copolymer
*[3]Styrere-butadiene block copolymer

EXAMPLE 7A 100 parts by weight of a mixture consisting of 66.7% by weight of the polystyrene having syndiotactic configuration as obtained in Reference Example 1, 28.6% by weight of an ethylene-propylene rubber (trade name: EP02P, produced by Nippon Synthetic Rubber Co., Ltd.) and 4.7% by weight of a styrene-hydrogenated butadiene block copolymer (trade name: G-1652, produced by Shell Chemical Co., Ltd.) and 1 part by weight of talc (trade name: FFR; average particle diameter; 0.6 μm, produced by Asada Seifun Co., Ltd.) were kneaded in a single-screw extruder having an inner diameter of 25 mm and injection molded by the use of a minimat molding machine to form a test piece, which was then measured for mechanical strength. The test piece was also measured for Vicat softening temperature according to JIS K 7206. The results are shown as follows.

Modulus in Tension: 30,000 kg/cm$^2$
Tensile Strength: 550 kg/cm$^2$
Izod Impact Strength (notched): 11.7 kg·cm/cm
Vicat Softening Temperature: 210° C.
Volume Average Particle Diameter of Rubber-Like Polymer in Composition: 3.5 μm REFERENCE EXAMPLE 2 (Same as above)
(Production of Polystyrene having Mainly Syndiotactic Configuration)

2 L of toluene as a solvent, and 5 mmol of tetraethoxytitanium and 500 mmol (as aluminum atom) of methylaluminoxane as catalyst components were placed in a reactor, and 15 L of styrene was introduced thereinto and polymerized for 4 hours at 55° C.

After the completion of polymerization, the reaction product was washed with a mixture of hydrochloric acid and methanol to decompose and remove the catalyst components, and then dried to obtain 2.5 kg of a styrene polymer (polystyrene). The polymer was subjected to Soxhlet extraction using methyl ethyl ketone as a solvent to obtain 97% by weight of an extraction residue. The weight average molecular weight of the extraction residue was 400,000. A $^{13}$C-NMR analysis (solvent: 1,2-dichlorobenzene) of the polymer showed an absorption at 145.35 ppm, ascribable to the syndiotactic configuration, and the syndiotacticity indicated in terms Of racemic pentad as calculated from the peak area was 98%.

REFERENCE EXAMPLE 3A

Commercially available granular resin elastomers (rubber-like polymers) were dispersed in acetone or methanol, sprayed to a micro mesh for observation under an electron microscope, and then observed under the electron microscope to determine the volume average particle diameter. The results are shown below.

(1) MAS Elastomer (trade name: KM-330, produced by Rohm & Haas Co., Ltd., USA) 0.3 μm
(2) MAS Elastomer (trade name: EXL-2330, produced by Rohm & Haas Co., Ltd., USA) 0.5 μm
(3) MAS Elastomer (trade name: M-101, produced by Kanegafuchi Kagaku Kogyo Co., Ltd.) 0.5 μm
(4) MBS Elastomer (trade name: C-223, produced by Mitsubishi Rayon Co., Ltd.) 0.4 μm
(5) MABS Elastomer (trade name: HIA-15, produced by Mitsubishi Rayon Co., Ltd.) 0.1 μm
(6) MAS Elastomer (trade name: W-529, produced by Kureha Kagaku Co., Ltd.) 0.2 μm

EXAMPLE 8A 100 parts by weight of a mixture of 90% by weight of the styrene polymer having syndiotactic configuration as obtained in Reference Example 2 and 10% by weight of a granular MAS elastomer (trade name: EXL-2330, produced by Rohm & Haas Co., Ltd., USA), 1 part by weight of PTBBA-Al (aluminum p-tert-butyl-benzoate) as a nucleating agent, 0.7 part by weight of (2,6-di-tert-butyl-4-methylphenyl)pentaerythritol diphosphite (trade name: PEP-36, produced by Adeka Agas Corp.) as an antioxidant and 0.1 part by weight of 2,6-di-tert-butyl-4-methylphenol (trade name: Sumiriser BHT, produced by Sumitomo Kagaku Co., Ltd.) were kneaded and pelletized by the use of a twin screw kneading extruder.

The pellets thus obtained were injection molded to form a test piece, which was then measured for Izod impact strength (notched) (according to JIS K7110), modulus in tension (according to JIS K7113) and Vicat softening temperature (according to JIS K7206). The results are shown in Table 2A.

A slice for examination under an electron microscope was cut away from the Izod test piece and observed by the phase contrast method. The particle diameter of the elastomer (rubber) as determined by the above method was 0.5 μm.

EXAMPLE 9A

The procedure of Example 8A was repeated with the exception that a mixture of 80% by weight of the styrene polymer having syndiotactic configuration as obtained in Reference Example 2 and 20% by weight of MAS elastomer (trade name: M-101, produced by Kanegafuchi Kagaku Co., Ltd.) was used; The results are shown in Table 2A.

The rubber particle diameter as determined from a slice in the same manner as in Example 8A was 0.5 μm.

EXAMPLE 10A

The procedure of Example 8A was repeated with the exception that a mixture of 70% by weight of the styrene polymer having syndiotactic configuration as obtained in Reference Example 2 and 30% by weight of MBS elastomer (trade name: C-223, produced by Mitsubishi Rayon Co., Ltd.) was used. The results are shown in Table 2A.

The rubber particle diameter as determined after dying a slice with osmic acid was 0.4 μm.

EXAMPLE 11A

The procedure of Example 8A was repeated with the exception that a mixture of 80% by weight of the styrene polymer having syndiotactic configuration as obtained in Reference Example 2, and 5% by weight of MBS elastomer (trade name: C-223, produced by Mitsubishi Rayon Co., Ltd.) and 15% by weight of MABS (trade name: HIA-15, produced by Mitsubishi Rayon Co., Ltd.) as granular elastomers was used. The results are shown in Table 2A.

The Izod test piece thus obtained was dissolved in hot xylene, and the gel portion was filtered and dried, dispersed in acetone and then observed under an electron microscope. Particles having a diameter of 0.4 μm and particles having a diameter of 0.1 μm were observed, and the area fraction in the observation area was about 1:3.

EXAMPLE 12A

The procedure of Example 8A was repeated with the exception that a mixture of the styrene polymer having syndiotactic configuration as obtained in Reference Example 2, and 2% by weight of MAS elastomer (trade name: M-101, produced by Kanegafuchi Kagaku Kogyo Co., Ltd.) and 30% by weight of MAS elastomer (trade name: W-529, produced by Kureha Kagaku Co., Ltd.) was used. The results are shown in Table 2A.

An electron microscopic examination after gel extraction showed particles having a diameter of 0.5 μm and particles having a diameter of 0.2 μm. The area fraction in the observation area was about 1:15.

EXAMPLE 13A

The procedure of Example 8A was repeated with the exception that a mixture of 85% by weight of the styrene polymer having syndiotactic configuration as obtained in Reference Example 2, and 10% by weight of MBS elastomer (trade name: C-223, produced by Mitsubishi Rayon Co., Ltd.) and 5% by weight of SBS elastomer (trade name: TR-1102, produced by Shell Chemical Co., Ltd.) as granular elastomers was used. The results are shown in Table 2A.

An electron microscopic examination of the gel showed particles having a diameter of 0.4 μm.

EXAMPLE 14A 50 parts by weight of polybutadiene having an average particle diameter of 1.0 μm, 20 parts by weight of styrene, 0.1 part by weight of potassium rhosinate, 0.1 part by weight of potassium hydroxide, 0.2 part by weight of sodium pyrophosphate, 0.3 part by weight of dextrose, 0.01 part by weight of ferrous sulfate and 150 parts by weight of water were placed in a reactor equipped with a stirrer. After purging with nitrogen, the temperature was raised to 70° C., and 0.2 part by weight of cumene hydroperoxide was added to perform the polymerization for one hour.

An emulsion consisting of 30 parts by weight of styrene, 1.5 parts by weight of potassium rhosinate, 0.1 part by weight of potassium hydroxide, 0.2 part by weight of cumene hydroperoxide and 50 parts by weight of water was separately prepared and added to the polymerization system over 3 hours.

The polymerization reaction was continued for one hour while maintaining the jacket temperature at 70° C.

To the latex above obtained were added 1.0 part by weight of 2,6-di-tert-butyl-p-cresol as an anti-aging agent and 2.0 parts by weight of sulfuric acid. The latex was solidified by heating, filtered, washed with water and dried to obtain a granular elastomer (SBR). The particle diameter was 1.2 μm.

Thereafter, the procedure of Example 8 was repeated with the exception that a mixture of 10% by weight of the above granular eastomer and 90% by weight of the styrene polymer having syndiotactic configuration as obtained in Reference Example 2A was used. The results are shown in Table 2A.

EXAMPLE 15A 70 parts by weight of a polybutadiene latex having an average particle diameter of 2.4 μm, 200 parts by weight of water and 0.3 part by weight of potassium persulfate were placed in a reactor, and 15 parts by weight of methyl methacrylate was dropped over 30 minutes while maintaining the temperature at 70° C. to perform polymerization. After the completion of dropwise addition, the polymerization was completed by maintaining at the same temperature for one hour.

Then, 15 parts by weight of styrene was dropped over 30 minutes to perform polymerization, and the polymerization was completed by maintaining for 60 minutes.

The average particle diameter of the graft copolymer latex as obtained above which was determined by an electron microscopic observation was 2.5 μm.

Subsequently, the graft copolymer latex was salted and solidified by adding an aqueous aluminum chloride solution, filtered, washed with water and dried to obtain a granular elastomer.

Thereafter the procedure of Example BA was repeated with the exception that a mixture of 10% by weight of the above granular elastomer and 90% by weight of the styrene polymer having syndiotactic configuration as obtained in Reference Example 2 was used. The results are shown in Table 2A.

TABLE 2A

| | | Composition | | | | | |
|---|---|---|---|---|---|---|---|
| | | Granular Elastomer having Volume Average Particle Diameter of 0.35 μm or more | | | Other Rubber-Like Polymer | | Vicat |
| No. | Styrene Polymer (wt %) | Type | Particle Diameter (μm) | (wt %) | Type | Particle Diameter (μm) | (wt %) | Softening Temp. (° C.) |
| Example 8 A | 90 | MAS[1] | 0.5 | 10 | — | — | — | 253 |
| Example 9 A | 80 | MAS[2] | 0.5 | 20 | — | — | — | 244 |
| Example 10 A | 70 | MBS[3] | 0.4 | 30 | — | — | — | 232 |
| Example 11 A | 80 | MBS[3] | 0.4 | 5 | MABS[4] | 0.1 | 15 | 237 |
| Example 12 A | 68 | MAS[2] | 0.5 | 2 | MAS[5] | 0.2 | 30 | 228 |
| Example 13 A | 85 | MBS[3] | 0.4 | 10 | SBS[6] | shapeless | 5 | 240 |
| Example 14 A | 90 | SBR | 1.2 | 10 | — | — | — | 250 |
| Example 15 A | 90 | MBS | 2.5 | 10 | — | — | — | 248 |

[1]EXL-2330,
[2]M-101,
[3]C-223,
[4]HIA-15
[5]W-529,
[6]TR-1102

REFERENCE EXAMPLE 4A
(Production of Polystyrene having Mainly Syndiotactic Configuration)

2 L of toluene as a solvent, and 1 mmol of cyclopentadienyltitanium trichloride and 0.8 mol (as aluminum atom) of methylaluminoxane as catalyst components were placed in a reactor, and 3.6 L of styrene was added and polymerized at 20° C. for one hour. After the completion of polymerization, the reaction product was washed with a mixture of hydrochloric acid and methanol to decompose and remove the catalyst components, and then dried to obtain 330 g of a polymer.

This polymer was subjected to Soxhlet extraction using methyl ethyl ketone as a solvent to obtain 95% by weight of an extraction residue. The polymer (extraction residue) had a weight average molecular weight of 290,000, a number average molecular weight of 158,000 and a melting point of 270° C. A $^{13}$C-NMR analysis of the polymer showed an absorption at 145.35 ppm, ascribable to the syndiotactic structure, and the syndiotacticity indicated in terms of pentad as calculated from the peak area was 96%.

EXAMPLE 15A 35 parts by weight of the polystyrene having syndiotactic configuration as obtained in Reference Example 4A,35 parts by weight of a methyl methacrylate-n-butyl acrylate-styrene copolymer (trade name: KM330, produced by Rohm & Haas Co., Ltd., USA) and 30 parts by weight of glass fiber having an average fiber length of 3 mm (produced by Asahi fiberglass Co., Ltd.; fiber diamete: 10 to 15 μm; chopped strand form) were dry blended, and then 1 part by weight of talc (trade name: Talc FFR, produced by Asada Seifun Co., Ltd.) as a crystal nucleating agent was added. They were mixed in a Henschel mixer, and then kneaded, extruded and pelletized by the use of an extruder. The pellets thus obtained were molded to form a test piece, which was then measured for mechanical strength and heat distortion temperature. The modulus in tension was 83,000 kg/cm$^2$, the tensile strength was 870 kg/cm$^2$, and the heat distortion temperature was 220° C.

In a still further embodiment wherein Components (A) syndiotactic styrene and (B) a thermoplastic resin are the main components, with optionally (D) an inorganic filler, again the syndiotactic polystyrene implied in the invention is a polymer of styrene of which the molecular structure relative to the stereospecificity is mainly syndiotactic or, in other words, a polymer of styrene in which the phenyl or substituted phenyl groups as the pendant groups to the main chain of the polymeric structure are positioned alternately to the reverse directions relative to the carbon-to-carbon linkages in the polymeric main chain. The tacticity thereof can be quantitatively determined by the nuclear magnetic resonance absorption spectrometric method, referred to as the NMR method hereinbelow.

The tacticity determined by the NMR method can be expressed by the proportion of a plural number of the structural units existing in consecutive sequence such as diads, triads and pentads for two, three and five structural units, respectively. The tacticity of the syndiotactic polystyrene as the component (a) of the inventive resin composition should be at least 85% and at least 50% for the diads and pentads, respectively. The polystyrene having such a stereospecificity is not limited to homopolymeric polystyrenes but includes poly(alkyl styrenes), poly(halogenated styrenes), poly(alkoxy styrenes), poly(styrene carboxylates) and mixtures thereof as well as copolymers mainly composed thereof. Exemplary of the poly(alkyl styrenes), poly(halogenated styrenes) and poly(alkoxy styrenes) ate: poly(methyl styrene), poly(ethyl styrene), poly(isopropyl styrene), poly(tert-butyl styrene) and the like; poly(chlorostyrene), poly(bromostyrene) and the like; and poly(methoxy styrene), poly(ethoxy styrene) and the like, respectively.

The syndiotactic polystyrene of the present invention has a weight-average molecular weight of at least 100,000, preferably at least 200,000. When said molecular weight is smaller than 100,000, the resin composition with sufficient heat resistance and mechanical strength can not be obtained.

When the polystyrene-based resin composition of the invention is composed of the syndiotactic polystyrene and a thermoplastic resin, the amount of the syndiotactic polystyrene in the resin composition should be in the range from 1 to 99% by weight, preferably from 5 to 95% by weight. When the amount thereof is smaller than 1% by weight, the desired effect cannot be fully exhibited in the improvement of the heat resistance of the thermoplastic resin while an amount thereof larger than 99% by weight results in the loss of the object of the present invention to improve the heat resistance of thermoplastic resins in general.

The basic ingredient of the inventive resin composition is an ordinary thermoplastic resin other than the above mentioned styrene-based polymers having a syndiotactic molecular structure. The thermoplastic resin is not limited to a specific one but can be selected from a variety of thermoplastic resins depending on the intended application of the resin composition. Exemplary of the thermoplastic resin are styrene-based polymers and copolymers including polystyrenes having an atactic molecular structure, polystyrenes having an isotactic molecular structure, AS resins, ABS resins, SBS resins, SEBS resins and the like, condensation-polymerized polymers including polyesters, polycarbonates, polyethers (e.g. polyphenylene ether), polyamides, polyoxymethylenes and the like, acrylic polymers including poly(acrylic acid), poly(acrylic acid esters), poly(methyl methacrylate) and the like, polyolefins including polyethylene, polypropylene, polybutene, poly(4-methylpentene-1 copolymers of ethylene and propylene and the like, polymers of vinyl halides including poly(vinyl chloride), poly(vinylidene chloride), poly(vinylidene fluoride) and the like, and so on.

The alternative additive ingredient in the inventive resin composition is an inorganic filler which is not limited to a specific one but can be selected from a variety of known inorganic fillers depending on the intended application of the resin composition. Exemplary of suitable inorganic fillers are glass fibers, carbon fibers, alumina fibers, carbon black, graphite, titanium dioxide, silica, talc, mica, asbestos, calcium carbonate, calcium sulfate, barium carbonate, magnesium carbonate, tin oxide, alumina, kaolin, silicon carbide, metal powders and the like. These inorganic fillers can be used either singly or as a combination of two kinds or more according to need.

When the inventive resin composition is composed of the syndiotactic polystyrene and the inorganic filler, the weight ratio of the syndiotactic polystyrene to the inorganic filler should be in the range from 15:85 to 99:1 or, preferably, from 50:50 to 95:5.

Further, when the inventive resin composition comprises the syndiotactic polystyrene, the thermoplastic resin and the inorganic filler, the formulation of the composition should contain from 5 to 50 parts by weight of the inorganic filler per 95 to 50 parts by weight of the total amount of the syndiotactic polystyrene and the thermoplastic resin.

The compounding work of the above described components to prepare the inventive resin composition can be performed by using a conventional blending machine such as a Banbury mixer, Henschel mixer, roller mill and the like. It is of course optional that the resin composition is prepared by the solution blending method.

The blending work of the components should be performed at an elevated temperature so that heat stabilizers conventionally used in the compounding works of atactic polystyrenes cannot be used due to the dissipation and thermal decomposition. Instead, the object of heat-stabilization of the inventive resin composition can be achieved by admixing the resin composition with from 0.005 to 5 parts by weight or, preferably, from 0.01 to 1 part by weight, per 100 parts by weight of the resinous ingredients, of a combination of a phenolic anti-oxidant and a phosphorus compound represented by the general formula

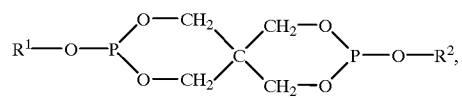

in which $R^1$ and $R^2$ are each, independently from the other, a monovalent hydrocarbon group selected from the class consisting of alkyl groups having 1 to 20 carbon atoms, cycloalkyl groups having 3 to 30 carbon atoms and aryl groups having 6 to 20 carbon atoms. The weight ratio of the phosphorus compound to the phenolic antioxidant should usually be in the range from 100:1 to 1:1 or, preferably, from 10:1 to 2:1.

Exemplary of the above mentioned phosphorus compound are distearyl pentaerithritol diphosphite, dioctyl pentaerithritol diphosphite, diphenyl pentaerithritol diphosphite, bis(2,4-di-tert-butyl phenyl) pentaerithritol diphosphite, bis(2,6-di-tert-butyl-4-methyl phenyl) pentaerithritol diphosphite, dicyclohexyl pentaerithritol diphosphite and the like.

The phenolic antioxidant can be any of known ones exemplified by 2,6-di-tert-butyl-4-methyl phenol, 2,6-diphenyl-4-methoxy phenol, 2,2'-methylene bis(6-tert-butyl-4-methyl phenol), 2,2'-methylene bis(6-tert-butyl-4-ethyl phenol), 2,2'-methylene bis[4-methyl-6-(α-methyl cyclohexyl) phenol], 1,1-bis(5-tert-butyl-4-hydroxy-2-methyl phenyl) butane, 2,2'-methylene bis(4-methyl-6-cyclohexyl phenol), 2,2'-methylene bis(4-methyl-6-nonyl phenol), 1,1,3-tris(5-tert-butyl-4-hydroxy-2-methyl phenyl) butane, 2,2-bis(5-tert-butyl-4-hydroxy-2-methyl phenyl 4-n-dodecyl mercapto butane, ethylene glycol bis[3,3-bis(3-tert-butyl-4-hydroxy phenyl) butyrate], 1,1-bis(3,5-dimethyl-2-hydroxy phenyl)-3-(n-dodecylthio) butane, 4,4'-thio-bis(6-tert-butyl-3-methyl phenol), 1,3,5-tris(3,5-di-tert-butyl-4-hydroxy benzyl)-2,4,6-trimethyl benzene, 2,2-bis(3,5-di-tert-butyl-4-hydroxy benzyl) malonic acid octadecyl ester, n-octadecyl 3-(4-hydroxy-3,5-di-tert-butyl phenyl) propionate, tetrakis[methylene (3,5-di-tert-butyl-4-hydroxy hydrocinnamate)]methane and the like.

When the inventive resin composition is prepared by compounding an inorganic filler having electroconductivity, such as carbon black, graphite and the like, in an amount of 10 to 60% by weight based on the overall amount of the resin composition with thorough mixing, the resultant resin composition can be a heat-sensitive resistive composition having a positive temperature coefficient. It is preferable that the electroconductive inorganic filler such as carbon black used in the above mentioned object has a particle diameter in the range from 10 to 200 nm.

The thus obtained resin composition has greatly improved properties in the heat resistance and mechanical strengths as compared to the polystyrene-based resin compositions conventionally used in various applications. Accordingly, the resin composition of the invention is useful in a wide field of applications as a material for various industrial uses and a material of various machines and instruments in which heat resistance and mechanical strengths higher than conventional are essential.

In the following, the polystyrene-based resin composition of the invention is described in more detail by way of examples and comparative examples.

Polymer Preparation 1. Preparation of a polystyrene resin having a mainly syndiotactic molecular structure.

Into a solution of 20 m moles of cyclopentadienyl titanium trichloride and 0.8 mole as aluminum atoms of methyl aluminoxane as the catalyst constituents dissolved in 2 liters of toluene were added 3.6 liters of styrene and the polymerization of styrene was performed at 20° C. for 1 hour. After completion of the polymerization reaction, the reaction product was washed with a mixture of hydrochloric acid and methyl alcohol to decompose and remove the catalyst constituents followed by drying to give 330 g of dried polymeric product.

The polymeric product was then subjected to extraction with methyl ethyl ketone as the extraction solvent using a Soxhlet extractor. The amount of the polymer remaining as unextracted was 95% by weight of the amount before extraction. This polymer had a weight-average molecular weight of about 280,000, number-average molecular weight of about 57,000 and melting point of 270° C. The NMR analysis of this polymer utilizing the $^{13}C$ carbon isotope indicated that the NMR absorption spectrum had a peak of absorption at 145.35 ppm which could be assigned to the syndiotactic molecular structure of polystyrene. Calculation from the area of this peak gave a result that the polymer had a syndiotacticity of 96% in pentads (refer to H. Sato & Y. Tanaka, J. Polym. Sci., Polym. Phys. Ed. 21, 1667–1674 (1983)).

Polymer Preparation 2. Preparation of a polystyrene resin having a mainly syndiotactic molecular structure.

Into a solution of 13.4 m moles of titanium tetraethoxide and 1340 m moles as aluminum atoms of methyl aluminoxane as the catalyst constituents dissolved in 1.2 liters of toluene were added 33 liters of styrene and the polymerization reaction was performed for 1.5 hours at 55° C. After completion of the polymerization reaction, the reaction product was washed with a mixture of hydrochloric acid and methyl alcohol to decompose and remove the catalyst constituents followed by drying to give 3.5 kg of a dried polymeric product.

The polymeric product was then subjected to extraction with methyl ethyl ketone as the extraction solvent using a Soxhlet extractor. The amount of the polymer remaining unextracted was 95% by weight of the amount before extraction. This polymer had a weight-average molecular weight of about 800,000, number-average molecular weight of about 26,700 and melting point of 270° C. The NMR analysis of this polymer utilizing the $^{13}C$ carbon isotope indicated that the NMR absorption spectrum had a peak of absorption at 145.35 ppm which could be assigned to the syndiotactic molecular structure of polystyrene. Calculation from the area of this peak gave a result that the polymer had a syndiotacticity of 97% in pentads.

EXAMPLE 1B

A resin composition was prepared by compounding 80 parts by weight of a polycarbonate resin (Idemitsu Polycarbonate A2500, a product by Idemitsu Petrochemical Co.) as a thermoplastic resin and 20 parts by weight of the syndiotactic polystyrene obtained in Polymer Preparation 1 described above. The resin composition was shaped by using a Minimat molding machine into test specimens of which the mechanical strengths as well as the Vicat softening point as a thermal property were measured to give the results shown in Table 1B.

EXAMPLE 2B

The same experimental procedure as in Example 1B was undertaken except that the blending ratio of the polycarbonate resin and the syndiotactic polystyrene was 50:50 by weight instead of 80:20 by weight. The results of the experiment are also shown in Table 1B.

EXAMPLE 3B

The same experimental procedure as in Example 1B was undertaken except that the blending ratio of the polycarbonate resin and the syndiotactic polystyrene was 20:80 by weight instead of 80:20 by weight. The results of the experiment are also shown in Table 1B.

EXAMPLE 4B

The same experimental procedure as in Example 1B was undertaken except that the polycarbonate resin as a thermoplastic resin was replaced with the same amount of a polyethylene terephthalate resin (Pyropet RY 533, a product by Toyo Boseki Co.). The results of the experiment are also shown in Table 1B.

EXAMPLE 5B

The same experimental procedure as in Example 4B was undertaken except that the blending ratio of the polyethylene. terephthalate resin and the syndiotactic polystyrene was 50:50 by weight instead of 80:20 by weight. The results of the experiment are also shown in Table 1B.

EXAMPLE 6B

The same experimental procedure as in Example 1B was undertaken except that the polycarbonate resin was replaced with the same amount of an ABS resin (JSR ABS 15, a product by Japan Synthetic Rubber Co.). The results of the experiment are also shown in Table 1B.

EXAMPLE 7B

The same experimental procedure as in Example 6B was undertaken except that the blending ratio of the ABS resin and the syndiotactic polystyrene was 50:50 by weight instead of 80:20 by weight. The results of the experiment are also shown in Table 1B.

EXAMPLE 8B

The same experimental procedure as in Example 1B was undertaken except that the polycarbonate resin was replaced with the same amount of a polysulfone resin (Udel Polysulfone P-1700, a product by Union Carbide Corp.). The results of the experiment are also shown in Table 1B.

EXAMPLE 9B

The same experimental procedure as in Example 8B was undertaken except that the blending ratio of the polysulfone resin and the syndiotactic polystyrene was 50:50 by weight instead of 80:20 by weight. The results of the experiment are also shown in Table 1B.

COMPARATIVE EXAMPLES 1B to 4B

Without blending with the syndiotactic polystyrene, measurement of the properties was undertaken of each of the polycarbonate resin, polyethylene terephthalate resin, ABS resin and polysulfone resin used in the preceding examples in Comparative Examples 1B, 2B, 3B, and 4B, respectively. The results of the measurements are also shown in Table 1B.

TABLE 1B

| | Tensile strength, kg/cm$^2$ | Ultimate elongation, % | Elastic modulus, kg/cm$^2$ | Vicat softening point[1] °C. |
|---|---|---|---|---|
| Example | | | | |
| 1B | 600 | 4.5 | 21,800 | 170 |
| 2B | 610 | 4.1 | 29,200 | 190 |
| 3B | 620 | 10.0 | 32,500 | 200< |
| 4B | 650 | 2.8 | 28,200 | 200< |
| 5B | 580 | 2.6 | 29,200 | 200< |
| 6B | 520 | 2.6 | 22,500 | 150 |
| 7B | 560 | 2.5 | 26,000 | 180 |
| 8B | 650 | 3.5 | 25,900 | 200< |
| 9B | 490 | 3.0 | 28,300 | 200< |

TABLE 1B-continued

| | Tensile strength, kg/cm$^2$ | Ultimate elongation, % | Elastic modulus, kg/cm$^2$ | Vicat softening point[1] °C. |
|---|---|---|---|---|
| Comparative Example | | | | |
| 1B | 590 | 120 | 15,200 | 150 |
| 2B | 710 | 7.6 | 26,900 | 200< |
| 3B | 500 | 15.3 | 20,300 | 110 |
| 4B | 710 | 60 | 21,700 | 190 |

EXAMPLE 10B

A resin compound was prepared by blending, in a Henschel mixer, 80 parts by weight of the syndiotactic polystyrene obtained in Polymer Preparation2B described above, 20 parts by weight of chopped glass fibers having an average fiber length of 3 mm (a product by Asahi Fiber Glass Co.), 0.5 part by weight of bis(2,4-di-tert-butyl phenyl) pentaerithritol diphosphite and 0.2 part by weight of n-octadecyl 3-(4-hydroxy-2,5-dibutyl phenyl)propionate and the resin compound was pelletized by kneading in and extruding out of an extruder machine. The pelletized resin compound was molded into test specimens of which the mechanical strengths were measured to give results including 1050 kg/cm$^2$ of tensile strength, 1490 kg/cm$^2$ of flexural strength and 98,000 kg/cm$^2$ of elastic modulus of bending. The heat distortion temperature of the test specimens was 250° C.

EXAMPLE 11B

The same experimental procedure as in Example 10B was undertaken except that the blending ratio of the syndiotactic polystyrene and chopped glass fibers was 70:30 by weight instead of 80:20. The test specimens prepared from the resin compound had properties including 1120 kg/cm$^2$ of tensile strength, 1600 kg/cm$^2$ of flexural strength, 104,000 kg/cm$^2$ of elastic modulus of bending and 250° C. Of heat distortion temperature.

EXAMPLE 12B

The same experimental procedure as in Example 10B was undertaken except that the chopped glass fibers as an inorganic filler were replaced with the same amount of chopped carbon fibers having a diameter of 9 μm and an average fiber length of 3 mm. The test specimens prepared from the resin compound had properties including 1100 kg/cm$^2$ of tensile strength, 1500 kg/cm$^2$ of flexural strength, 90,000 kg/cm$^2$ of elastic modulus of bending and 250° C. Of heat distortion temperature.

EXAMPLE 13B

The same experimental procedure as in Example 12B was undertaken except that the blending ratio of the syndiotactic polystyrene and the chopped carbon fibers was 70:30 by weight instead of 80:20. The test specimens prepared from the resin compound had properties including 1200 kg/cm$^2$ of tensile strength, 1600 kg/cm$^2$ of flexural strength, 90,000 kg/cm$^2$ of elastic modulus of bending and 250° C. Of heat distortion temperature.

EXAMPLE 14B

The same experimental procedure as in Example 10B was undertaken except that the chopped glass fibers as an inorganic filler were replaced with the same amount of pulverized mica having a fineness of 60 mesh or finer by the Tyler standard. The test specimens prepared from the resin compound had a heat distortion temperature of 230° C.

EXAMPLE 15B

The same experimental procedure as in Example 14B was undertaken except that the blending ratio of the syndiotactic polystyrene and the mica powder was 50:50 by weight. The test specimens prepared from the resin compound had a heat distortion temperature of 250° C.

COMPARATIVE EXAMPLE 5B

The same experimental procedure as in Example 10B was undertaken except that the syndiotactic polystyrene was replaced with the same amount of a commercial product of polystyrene resin having an atactic structure of the polymer in the stereospecificity and a weight-average molecular weight of about 300,000 (a product by Idemitsu Petrochemical Co.). The test specimens prepared from the resin compound had properties including 650 kg/cm$^2$ of tensile strength, 690 kg/cm$^2$ of flexural strength, 36,000 kg/cm$^2$ of elastic modulus of bending and 110° C. of heat distortion temperature.

EXAMPLE 16B

A resin compound was prepared by blending, in a Henschel mixer, 40 parts by weight of the syndiotactic polystyrene obtained in Polymer Preparation 2B described above, 40 parts by weight of a commercial product of a polystyrene resin having an atactic molecular structure as a thermoplastic resin (Idemitsu Styrol US 315, a product by Idemitsu Petro-chemical Co.), 20 parts by weight of chopped glass fibers having an average fiber length of 3 mm (a product by Asahi Fiber Glass Co.), 0.5 part by weight of bis(2,4-di-tert-butyl phenyl) pentaerithritol diphosphite and 0.2 part by weight of tetrakis[methylene (3,5-di-tert-butyl-4-hydroxy hydrocinnamate)] methane and the resin compound was pelletized by kneading in and extruding out of an extruder machine. The pelletized resin compound was shaped into test specimens of which the mechanical and thermal properties were measured to give the results shown in Table 2B below.

EXAMPLES 17B TO 20B

The same experimental procedure as in Example 16B was undertaken in each of Examples 17B to 20B except that the atactic polystyrene used as a thermoplastic resin was replaced each with the same amount of the polycarbonate resin used in Example 1B, the polyethylene terephthalate resin used in Example 4B, the ABS resin used in Example 6B and the polysulfone resin used in Example 8B, respectively. Table 2B also shows the mechanical and thermal properties of the test specimens prepared from the resin compounds.

TABLE 2B

| Example No. | Tensile strength, kg/cm$^2$ | Ultimate elongation, % | Elastic modulus, kg/cm$^2$ | Vicat softening point[1] °C. |
|---|---|---|---|---|
| 16B | 870 | 1.3 | 80,000 | 200< |
| 17B | 920 | 2.0 | 105,000 | 200< |
| 18B | 950 | 1.4 | 110,000 | 200< |

TABLE 2B-continued

| Example No. | Tensile strength, kg/cm$^2$ | Ultimate elongation, % | Elastic modulus, kg/cm$^2$ | Vicat softening point[1] °C. |
|---|---|---|---|---|
| 19B | 840 | 1.4 | 94,000 | 200< |
| 20B | 740 | 1.6 | 102,000 | 200< |

EXAMPLE 21B

A resin compound was prepared, in a Labo-plastomill, by blending 60 parts by weight of the syndiotactic polystyrene prepared in Polymer Preparation 2B described above and 40 parts by weight of carbon black having an average particle diameter of 43 nm (Diablack E, a product by Mitsubishi Chemical Industry Co.) and kneading the blend at 295° C. for 20 minutes. The resin compound was pelletized and then compression-molded into a sheet in a compression molding machine at 300° C. under a pressure of 150 kg/cm$^2$ taking 10 minutes.

The thus prepared resin sheet was sandwiched between two foils of electrolytic nickel and pressed under the same conditions as above so that the nickel foils were bonded to and integrated with the resin sheet to give a laminated sheet having a thickness of 1 mm. Test pieces of each 1 cm by 1 cm wide were prepared by cutting the laminated sheet and subjected to the measurement of the electric properties utilizing the two nickel foils on both sides of the resin sheet as the electrodes.

The electrical measurement gave a result that the specific resistance of the resin sheet was 1.0 ohm·cm at room temperature. The specific resistance showed a rapid increase by temperature elevation at 280° C. to give a value which was larger than that at room temperature by 10$^{2.5}$ times. The characteristic of power consumption as a heater element was examined to find that the heat evolution corresponded to 2.4 watts in the steady-value region where the product of the current and voltage had a constant value.

What is claimed is:

1. A polystyrene-based resin composition comprising (A) 25–75 parts by weight of a styrene-based resin with a mainly syndiotactic configuration selected from the group consisting of polystyrene, poly(alkylstyrene), poly(halogenated styrene), poly(alkoxystyrene), styrene copolymers comprised of polymerized units of at least two of styrene, alkylstyrene, halogenated styrene and alkoxystyrene, and mixtures thereof, (B) 75–25 parts by weight of a nylon polyamide, and (C) 2–30 parts by weight of a rubber polymer having a volume average particle diameter of 0.1–4μm, said rubber polymer being selected from the group consisting of maleated SBS and maleated SEBS, based on a total amount of 100 parts by weight of the composition.

2. The composition of claim 1, further comprising an inorganic filler (D).

3. The composition of claim 1, wherein said polyamide (B) is nylon 66.

4. The composition of claim 1, wherein said polyamide (B) is nylon 6.

5. The composition of claim 2, wherein said inorganic filler (D) is a carbon, alumina, or glass fiber.

6. The composition of claim 2, wherein said inorganic filler (D) is a granular or powdered filler selected from the group consisting of talc, carbon black, graphite, titanium dioxide, silica, mica, calcium carbonate, calcium sulfate, barium carbonate, magnesium carbonate, magnesium, sulfate, barium sulfate, oxysulfate, tin oxide, alumina, kaolin, silicon carbide, and metal powder.

7. The composition of claim 1, further comprising an antioxidant.

8. The composition of claim 2, wherein said polyamide (B) is nylon 66.

9. The composition of claim 2, wherein said polyamide (B) is nylon 6.

10. The composition of claim 2, further comprising an antioxidant.

11. A polystyrene-based resin composition comprising (A) 25–75 parts by weight of a styrene-based resin with a mainly syndiotactic configuration selected from the group consisting of polystyrene, poly(alkylstyrene), poly(halogenated styrene), poly(alkoxystyrene), styrene copolymers comprised of polymerized units of at least two of styrene, alkylstyrene, halogenated styrene and alkoxystyrene, and mixtures thereof, (B) 75–25 parts by weight of a nylon polyamide, and (C) 2–30 parts by weight of a rubber polymer as main components, said rubber polymer being selected from the group consisting of maleated SBS and maleated SEBS, based on a total amount of 100 parts by weight of the composition.

12. The composition of claim 1, wherein said rubber polymer (C) is maleated SEBS.

13. The composition of claim 11, wherein said rubber polymer (C) is maleated SEBS.

14. The composition of claim 1, wherein said rubber polymer (C) is maleated SBS.

15. The composition of claim 11, wherein said rubber polymer (C) is maleated SBS.

* * * * *